United States Patent
Li et al.

(10) Patent No.: US 11,548,368 B2
(45) Date of Patent: Jan. 10, 2023

(54) SERIES-PARALLEL HYBRID POWER SYSTEM AND VEHICLE WORKING MODE DECISION-MAKING METHOD

(71) Applicants: ZHEJIANG GEELY HOLDING GROUP CO., LTD, Zhejiang (CN); ZHEJIANG GEELY NEW ENERGY COMMERCIAL VEHICLES CO., LTD, Zhejiang (CN)

(72) Inventors: Shufu Li, Hangzhou (CN); Wenyuan Cai, Hangzhou (CN); Hongxing Hu, Hangzhou (CN); Jianlin Wei, Hangzhou (CN); Yuanze Lin, Hangzhou (CN)

(73) Assignees: ZHEJIANG GEELY HOLDING GROUP CO., LTD, Hangzhou (CN); ZHEJIANG GEELY NEW ENERGY COMMERCIAL VEHICLES CO., LTD, Hangzhou (CN)

( * ) Notice: Subject to any disclaimer, the term of this patent is extended or adjusted under 35 U.S.C. 154(b) by 260 days.

(21) Appl. No.: 16/968,442

(22) PCT Filed: Nov. 29, 2018

(86) PCT No.: PCT/CN2018/118270
§ 371 (c)(1),
(2) Date: Aug. 7, 2020

(87) PCT Pub. No.: WO2019/153850
PCT Pub. Date: Aug. 15, 2019

(65) Prior Publication Data
US 2020/0398655 A1    Dec. 24, 2020

(30) Foreign Application Priority Data
Feb. 9, 2018   (CN) .......................... 201810136031.8

(51) Int. Cl.
*B60K 6/44*      (2007.10)
*B60K 6/26*      (2007.10)
(Continued)

(52) U.S. Cl.
CPC ............... *B60K 6/442* (2013.01); *B60K 6/26* (2013.01); *B60K 6/28* (2013.01); *B60W 10/08* (2013.01);
(Continued)

(58) Field of Classification Search
CPC . B60K 6/442; B60K 6/26; B60K 6/28; B60K 2006/262; B60W 10/08; B60W 2520/10; B60W 2540/10; B60W 2540/12
See application file for complete search history.

(56) References Cited

U.S. PATENT DOCUMENTS 7,647,994 B1    1/2010  Belloso
8,209,095 B2 *  6/2012  Mackin .................. B60L 50/15
                                                  701/50
(Continued)

FOREIGN PATENT DOCUMENTS

CN     1439545 A     9/2003
CN   102556055 A     7/2012
(Continued)

OTHER PUBLICATIONS

Office Action for EP Application No. 18905782.1 dated Dec. 17, 2020 (6 pages).
(Continued)

*Primary Examiner* — Tisha D Lewis
(74) *Attorney, Agent, or Firm* — Alston & Bird LLP (57) ABSTRACT

A hybrid power drive system, including a power battery device, a range extender system, and a motor drive system. The power battery device is configured to supply power to the motor drive system. The range extender system includes
(Continued)

an engine and a generator. The generator is able to generate power under the driving of the engine to supply the power to the motor drive system and/or charge the power battery device. The hybrid power drive system further includes a vehicle control unit configured to control the engine and/or generator of the range extender system to generate a driving force. The range extender system is mechanically connected to a main coupling mechanism to transmit the generated driving force to a main drive axle of a vehicle by means of the main coupling mechanism to drive wheels on both sides of the axle to rotate. Also provided is a vehicle having the hybrid power drive system. According to the hybrid power drive system and the vehicle having same, the vehicle control unit is utilized to control the engine and/or generator of the range extender system to generate the driving force for different application operating conditions, and thus the economy of the vehicle can be effectively improved.

15 Claims, 5 Drawing Sheets

(51) Int. Cl.
*B60K 6/28* (2007.10)
*B60W 10/08* (2006.01)
*B60W 10/06* (2006.01)
*B60W 10/26* (2006.01)
*B60K 6/442* (2007.10)

(52) U.S. Cl.
CPC .... *B60K 2006/262* (2013.01); *B60W 2520/10* (2013.01); *B60W 2540/10* (2013.01); *B60W 2540/12* (2013.01)

(56) References Cited

U.S. PATENT DOCUMENTS

| | | | |
|---|---|---|---|
| 2005/0133284 A1 | 6/2005 | Alster et al. | |
| 2007/0191180 A1* | 8/2007 | Yang | B60W 20/20 477/5 |
| 2009/0233759 A1* | 9/2009 | Sheidler | A01D 41/127 477/3 |
| 2017/0096134 A1* | 4/2017 | Yoon | B60W 20/13 |

FOREIGN PATENT DOCUMENTS

| | | |
|---|---|---|
| CN | 202806334 U | 3/2013 |
| CN | 104044589 A | 9/2014 |
| CN | 104228823 A | 12/2014 |
| CN | 105593096 A | 5/2016 |
| CN | 105667502 A | 6/2016 |
| CN | 106218391 A | 12/2016 |
| CN | 106560361 A | 4/2017 |
| CN | 108382186 A | 8/2018 |
| DE | 4134160 A1 | 4/1993 |
| DE | 102009050956 A1 | 5/2011 |
| WO | WO-2003/064202 A1 | 8/2003 |
| WO | WO-2017/194257 A1 | 11/2017 |

OTHER PUBLICATIONS

International Search Report of PCT/CN2018/118270 dated Feb. 27, 2019 (6 pages).
$2^{nd}$ Office Action for EP Application No. 18905782.1 dated Jun. 4, 2021 (5 pages).
$3^{rd}$ Office Action for EP Application No. 18905782.1 dated Jan. 20, 2022 (8 pages).

* cited by examiner

SERIES-PARALLEL HYBRID POWER SYSTEM AND VEHICLE WORKING MODE DECISION-MAKING METHOD

CROSS-REFERENCE TO RELATED APPLICATIONS

The present application is a national phase entry of International Application No. PCT/CN2018/118270, filed Nov. 29, 2018, which claims priority to Chinese Patent Application No. 201810136031.8, filed Feb. 9, 2018, which are incorporated herein by reference in their entirety.

TECHNICAL FIELD

The present invention relates to the technical field of vehicles, and in particular, to a series-parallel hybrid power system and a vehicle working mode decision-making method.

BACKGROUND ART

In recent years, with development of productivity and increase of automobile demand, people's demand for energy, especially vehicle energy, is increasing. Meanwhile, environmental problems are becoming increasingly prominent. Energy and environment are becoming important factors affecting the development of the automobile industry.

Electric vehicles are considered to be the most potential new energy vehicles to solve energy crisis and environmental pollution. As the ultimate goal of the new energy vehicle industry, pure electric vehicles or fuel cell vehicles still need to solve many technical problems and break through a number of technical bottlenecks, and charging or refueling supporting facilities need to be further improved. In addition, the pure electric vehicles also have range anxiety problems, such as short driving range, long charging time, and the like.

At present, with respect to the defects of range anxiety of the pure electric vehicles, hybrid electric vehicles effectively overcome the defects. Therefore, the hybrid electric vehicles have become an industry consensus as an intermediate transition state in the present stage. However, the hybrid power architecture of the traditional hybrid electric vehicles is a hybrid power architecture with a single engine. The conversion efficiency of the vehicles is low under high-speed working conditions. Furthermore, the mechanical structure of a hybrid electric vehicle system is too complex, and the control difficulty is high.

SUMMARY OF THE INVENTION

An object of the present invention is to provide a series-parallel hybrid power system which is particularly applicable to commercial vehicles as well as heavy trucks such as municipal vehicles, oil tank trucks and garbage trucks. Another object of the present invention is to provide a vehicle working mode decision-making method based on a series-parallel hybrid power system.

According to one aspect of the present invention, a series-parallel hybrid power system for a vehicle is provided. The series-parallel hybrid power system for the vehicle includes a traditional power device and a motor driving device. The traditional power device and the motor driving device are able to be respectively coupled to a driving shaft of the vehicle to drive wheels to rotate. The traditional power device includes a first engine. The hybrid power system further includes a power battery device configured to store electric power and supply the electric power to the motor driving device and/or other vehicle electrical loads; and a vehicle-mounted electric power generation device including a second engine and an electric power generator. The second engine is configured to drive the electric power generator to generate electric power, such that the electric power is supplied to any of the motor driving device, the power battery device and other vehicle electrical loads or a combination thereof.

Further, the traditional power device and the motor driving device are respectively coupled to different driving shafts of the vehicle.

Further, the hybrid power system further includes: a whole vehicle control system configured to control the traditional power device, the motor driving device, the power battery device and the vehicle-mounted electric power generation device according to an electric power state of a power battery and driving state data, such that the hybrid power system works in different working modes.

Further, the hybrid power system further includes: a driving state data acquisition device configured to acquire current driving state data of the vehicle, the current driving state data of the vehicle includes driver intention information, road condition information, current position information and power and torque request information.

Further, the driving state data acquisition device is configured to acquire a brake pedal signal, an accelerator pedal signal, a gear signal and a vehicle speed signal of the vehicle to determine the driver intention information and the power and torque request information.

Further, the driving state data acquisition device is configured to acquire the current position information and the road condition information according to an intelligent network connection signal and/or a GPS signal.

Further, acquiring the road condition information further includes: identifying the road condition information in a navigation planning path according to a 3D map, the intelligent network connection signal and/or the GPS signal.

Further, acquiring the current position information further includes: acquiring vehicle emission regulations of an area of a current position, such that the whole vehicle control system controls the working mode of the vehicle to conform to the regulations.

Further, the working modes include: a pure electric mode, a series mode, a parallel mode, a traditional driving mode and a series-parallel mode. In the pure electric mode, the power battery device supplies the electric power to the motor driving device, the motor driving device works to provide power for the driving shaft coupled thereto, and meanwhile, the traditional power device and the vehicle-mounted electric power generation device do not work. In the series mode, the power battery device supplies the electric power to the motor driving device, the motor driving device works to provide power for the driving shaft coupled thereto, and meanwhile, the vehicle-mounted electric power generation device works, while the traditional power device does not participate in driving. In the parallel mode, the motor driving device and the traditional power device are both in a working state to provide power for the driving shafts coupled thereto respectively, and meanwhile, the power battery device supplies the electric power to the motor driving device, while the vehicle-mounted electric power generation device does not work. In the traditional driving mode, the traditional power device works, the first engine provides power for the driving shaft coupled thereto via a closed clutch, and meanwhile, the motor driving device does not participate in driving. In the series-parallel mode, the motor driving device and the traditional power device are both in a working state to provide power for the driving shafts coupled thereto respectively, and meanwhile, the power battery device supplies the electric power to the motor driving device, and the vehicle-mounted electric power generation device runs to generate the electric power.

Further, the traditional power device further includes a first speed changing device and a first differential mechanism. The first engine is dynamically coupled to the first speed changing device via the clutch, and the traditional power device is coupled to the driving shaft via the first differential mechanism. In the series mode, the whole vehicle control system disconnects mechanical connection of the clutch, such that the first engine stops passive rotation.

Further, the motor driving device further includes a driving motor, a driving motor controller, a second speed changing device and a second differential mechanism, and the motor driving device is coupled to the driving shaft via the second differential mechanism. In the traditional driving mode, the whole vehicle control system controls the driving motor controller, such that the driving motor is in a free rotation state.

According to another aspect of the present invention, a vehicle working mode decision-making method based on a series-parallel hybrid power system is further provided. The vehicle working mode decision-making method is used for the above-mentioned series-parallel hybrid power system. The method includes: acquiring electric power state data of a power battery and driving state data of a vehicle; and based on the electric power state data and the driving state data, controlling the traditional power device, the motor driving device, the power battery device and the vehicle-mounted electric power generation device, such that the hybrid power system works in different working modes.

Further, the driving state data include driver intention information, road condition information, current position information and power and torque request information.

Further, acquiring the driver intention information and the power and torque request information includes: acquiring a brake pedal signal, an accelerator pedal signal, a gear signal and a vehicle speed signal of the vehicle to determine the driver intention information and the power and torque request information.

Further, acquiring the road condition information and the current position information includes: acquiring the current position information and the road condition information according to an intelligent network connection signal and/or a GPS signal.

Further, acquiring the road condition information further includes: identifying the road condition information in a navigation planning path according to a 3D map, the intelligent network connection signal and/or the GPS signal.

Further, acquiring the current position information further includes: acquiring vehicle emission regulations of an area of a current position, such that the whole vehicle control system controls the working mode of the vehicle to conform to the regulations.

Further, the working modes include: a pure electric mode, a series mode, a parallel mode, a traditional driving mode and a series-parallel mode. In the pure electric mode, the power battery device supplies electric power to the motor driving device, the motor driving device works to provide power for the driving shaft coupled thereto, and meanwhile, the traditional power device and the vehicle-mounted electric power generation device do not work. In the series mode, the power battery device supplies electric power to the motor driving device, the motor driving device works to provide power for the driving shaft coupled thereto, and meanwhile, the vehicle-mounted electric power generation device works, while the traditional power device does not participate in driving. In the parallel mode, the motor driving device and the traditional power device are both in a working state to provide power for the driving shafts coupled thereto respectively, and meanwhile, the power battery device supplies electric power to the motor driving device, while the vehicle-mounted electric power generation device does not work. In the traditional driving mode, the traditional power device works to provide power for the driving shaft coupled thereto, and meanwhile, the motor driving device does not participate in driving. In the series-parallel mode, the motor driving device and the traditional power device are both in a working state to provide power for the driving shafts coupled thereto respectively, and meanwhile, the power battery device supplies electric power to the motor driving device, and the vehicle-mounted electric power generation device runs to generate the electric power.

The present invention provides the series-parallel hybrid power system based on double engines. Compared with a traditional single-engine series-parallel hybrid power system with a complex structure and control difficulty, the series-parallel hybrid power system provided by the present invention has the advantages that the mechanical structure is relatively simple, complex mechanical power coupling devices such as planet gears are removed, and a complex mechanical structure is replaced by a simpler and more flexible vehicle working mode decision-making and combined control mode. Not only can the problem of range anxiety of a pure electric vehicle, the problem of low conversion efficiency of a series hybrid electric vehicle under high-speed working conditions and the problem that a series-parallel hybrid electric vehicle is too complex in system and too high in control difficulty be solved simultaneously, but also a miniaturization design can be carried out, namely, a traditional engine is replaced by a lower-power, smaller-size and lower-cost engine, and compared with a pure electric scheme, the scheme has the characteristics that the motor system is lower in power, smaller in size and lower in cost, and the power battery system is smaller in capacity, smaller in size and lighter in weight. The average oil consumption of an engine system can be further reduced, emission of $CO_2$ and toxic and harmful substances is reduced, the implementation difficulty is low, the value of engineering and mass production is high, and the series-parallel hybrid power system is particularly applicable to the commercial vehicles as well as the heavy trucks.

Further, the present invention further provides the vehicle working mode decision-making method with high economy based on the series-parallel hybrid power system. It is ensured that the power system always runs in a working condition point area with an optimal system efficiency. The optimal combination of power systems is searched, and the power systems are controlled to run efficiently in a coordinated manner.

The above and other objects, advantages and features of the present invention will become more apparent to those skilled in the art from the following detailed description of specific embodiments of the present invention in conjunction with the accompanying drawings.

BRIEF DESCRIPTION OF THE DRAWINGS

Some specific embodiments of the present invention will be described in detail hereinafter by way of example and not by way of limitation with reference to the accompanying drawings. The same reference numerals in the drawings indicate the same or similar components or parts. It should be appreciated by those skilled in the art that these drawings are not necessarily drawn to scale. In the drawings.

DETAILED DESCRIPTION OF THE INVENTION

In the technical field of hybrid electric vehicles, according to structural division, a hybrid power system generally has three hybrid power system architectures including a series type, a parallel type and a series-parallel type, and the three hybrid power architectures are all hybrid power system architectures based on a single engine.

The series hybrid power architecture is mainly composed of four assemblies including an engine, an electric power generator, a driving motor and a power battery. The engine does not directly participate in mechanical driving, but drives the electric power generator assembly to generate electric power, to convert mechanical energy into electric energy which is stored in a power battery system or directly drives a motor system. The series hybrid power system has the advantages of simple structure and relatively easy control, but the multi-stage energy conversion characteristic of the system determines that under certain specific conditions (such as running on a highway), advantages of system efficiency and economy do not exist.

The parallel hybrid power architecture is mainly composed of an engine, a speed changing mechanism, a driving motor, a mechanical coupling device and a power battery. Unlike the series hybrid power architecture, in a parallel scheme, the engine directly participates in mechanical driving, and a driving motor system also participates in the mechanical driving. An advantage of the system architecture is that the power of the engine can be directly used to drive a vehicle with less energy loss due to multi-stage conversion. However, the engine of the system and driving wheels are connected mechanically, the working point of the engine cannot always be in an optimal area, and the optimal conversion efficiency of the engine is not fully exerted.

The series-parallel hybrid power architecture is mainly composed of assemblies including an engine, a speed changing mechanism, a driving motor, a mechanical coupling device, an electric power generator, a power battery and the like. In the series-parallel system, working principles and modes of the series type and the parallel type are combined. The series-parallel system has the advantages of the series type and the parallel type, the advantages of the series type and the parallel type can be played, and the working mode is very flexible. The series-parallel hybrid power architecture has the defects that the arrangement structure of the power system is complex, the control difficulty is large, and the cost is relatively high.

Figure 1:
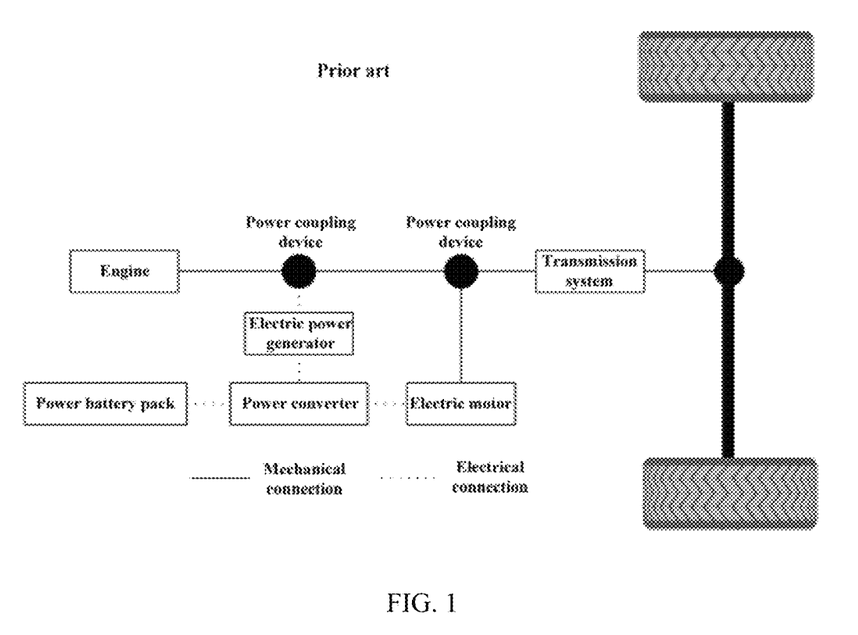
FIG. 1 is a schematic diagram of a traditional series-parallel hybrid power system architecture.

FIG. 1 illustrates a traditional series-parallel hybrid power system architecture. As shown in FIG. 1, the traditional series-parallel hybrid power system adopts a single-engine power system architecture. An engine is coupled to an output shaft of a driving motor and an output shaft of an electric power generator by one or more power coupling devices.

In a series mode, the engine does not participate in driving, and drives the electric power generator via a power coupling device to generate electric power, and then the electric power is supplied to the engine to drive a vehicle to move.

In a parallel mode, the engines simultaneously output torque through the power coupling devices to jointly drive the vehicle to run.

In a series-parallel mode, the engine transmits part of torque to an electric power generator system through the power coupling device to generate electric power, and meanwhile transmits part of torque to a transmission system through the power coupling devices to drive the vehicle together with the engine through the power coupling devices.

Figure 2:
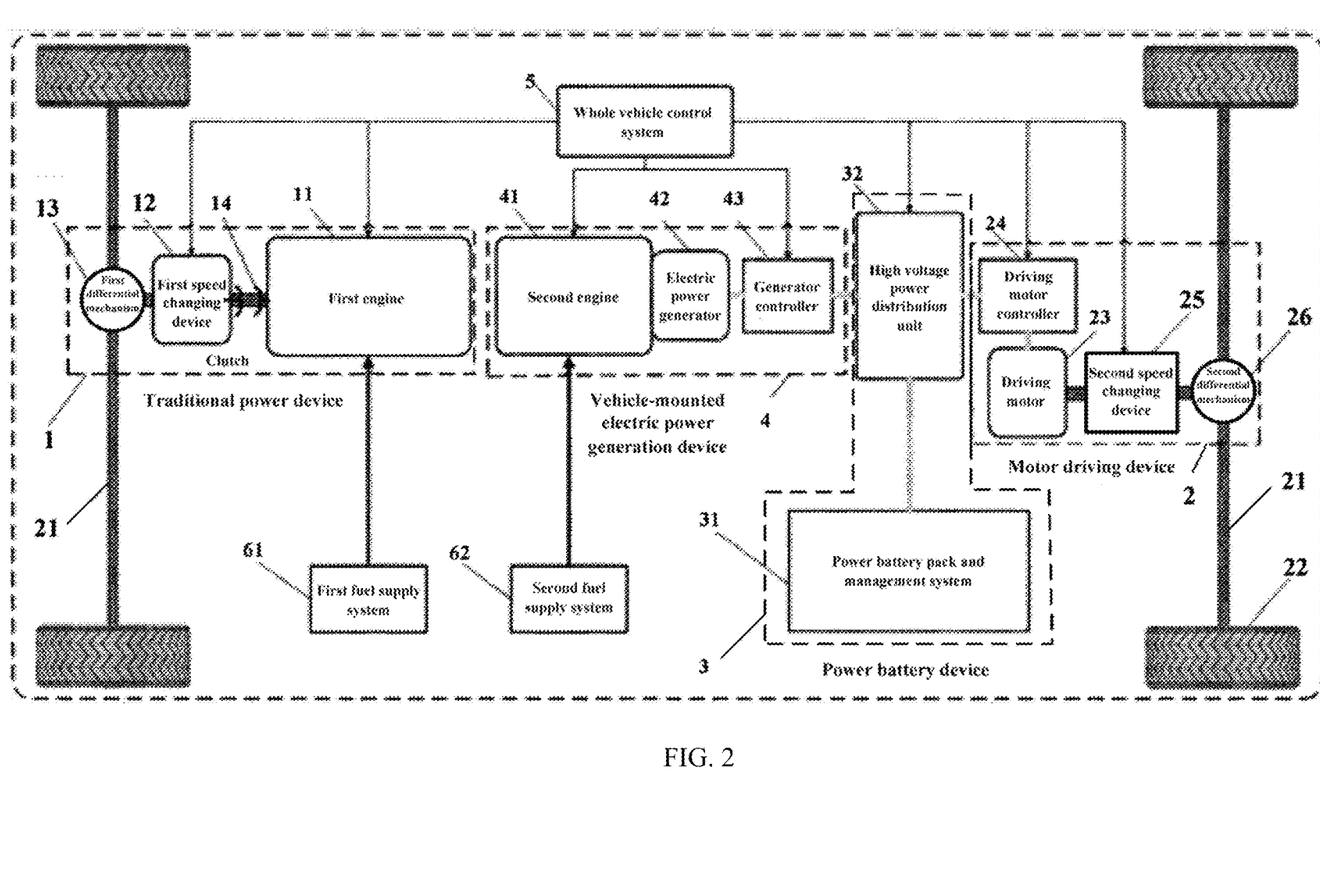
FIG. 2 is a schematic structural diagram of a series-parallel hybrid power system according to an embodiment of the present invention.

FIG. 2 illustrates a schematic structural diagram of a series-parallel hybrid power system for a vehicle according to an embodiment of the present invention. Referring to FIG. 2, the system includes a traditional power device 1 and a motor driving device 2. The traditional power device 1 and the motor driving device 2 are able to be respectively coupled to a driving shaft 21 of the vehicle to drive wheels 22 to rotate, and the traditional power device 1 includes a first engine 11. In addition, the hybrid power system may further include a power battery device 3 and a vehicle-mounted electric power generation device 4. The power battery device 3 is configured to store electric power and supply the electric power to the motor driving device 2 and/or other vehicle electrical loads (not shown in the figure). The vehicle-mounted electric power generation device 4 includes a second engine 41 and an electric power generator 42. The second engine 41 is configured to drive the electric power generator 42 to generate the electric power, such that the electric power is supplied to any of the motor driving device 2, the power battery device 3 and other vehicle electrical loads or a combination thereof. The series-parallel hybrid power system for the vehicle according to the embodiment of the present invention can be applied to commercial vehicles, such as medium and heavy trucks, municipal vehicles, oil tank trucks, garbage trucks and so on.

In this embodiment, the first engine 11 in the traditional power device 1 can directly participate in mechanical driving to provide power for the vehicle. The second engine 41 in the vehicle-mounted electric power generation device 4 does not directly participate in mechanical driving, but drives the electric power generator 42 to generate the electric power. The electric power generated by the electric power generator 42 under drive of the second engine 41 can charge the power battery device 3 so as to convert mechanical energy into electric energy for storage in the power battery device 3, and the power battery device 3 supplies the electric power to the motor driving device 2. The electric power generated by the electric power generator 42 under drive of the second engine 41 can also be directly supplied to the motor driving device 2, and then the motor driving device 2 drives the vehicle to provide power for the vehicle. The electric power generated by the electric power generator 42 under drive of the second engine 41 can also be supplied to other vehicle electrical loads. In the embodiment of the present invention, the other vehicle electrical loads may at least include a display, a sound box, and an air conditioner on the vehicle, and the embodiment of the present invention does not specifically limit the vehicle electrical loads.

The power battery device 3 of the embodiment of the present invention can store the electric power, and the stored electric power can be supplied to the motor driving device 2 and can also be supplied to the other vehicle electrical loads. It has been described above that the source of the electric power stored by the power battery device 3 is electric energy generated by the electric power generator 42 under drive of the second engine 41. Of course, the power battery device 3 may also be charged by an external power supply and store electric power supplied by the external power supply.

In general, an engine has the characteristics of low heat value efficiency, high fuel consumption rate, poor emission and the like under the condition of low-speed running. However, when the rotation speed and load of the engine reach a certain specific value, better heat value efficiency, lower fuel consumption rate and better emission performance can be maintained within a threshold range. Therefore, the engine does not have the advantages of economy, emission and the like when running under low-speed working conditions. On the contrary, the engine has the advantages of high heat value efficiency and good emission under high-speed working conditions. Thus, the traditional power device 1 having the first engine 11 directly participating in the mechanical driving is more suitable for running under the high-speed working conditions.

The engine has the characteristics of low heat value efficiency, high fuel consumption rate, poor emission and the like under the condition of low-speed running. Therefore, in order to prevent the engine from working in a low-efficiency area, the embodiment of the present invention adopts the motor driving device 2 to replace the low-speed running process of the engine. Experiments show that the system efficiency of the motor driving device 2 according to the embodiment of the present invention in a low-speed range generally reaches 70% or above, and moreover, the heat value efficiency of the engine under the low-speed working conditions is relatively low, for example, the heat value efficiency of the engine under idle working conditions only reaches 10% or less.

With continued reference to FIG. 2, in an embodiment of the present invention, the power battery device 3 includes a power battery pack and management system 31 and a high voltage power distribution unit 32. In this embodiment, the high voltage power distribution unit 32 may be in high voltage electrical connection with a generator controller 43, and the generator controller 43 is also in high voltage electrical connection with the electric power generator 42. After the second engine 41 drives the electric power generator 42 to generate electric power, electric energy can be transmitted to the high voltage power distribution unit 32 via the generator controller 43, and then the high voltage power distribution unit 32 directly supplies the electric energy to the motor driving device 2 or charges a power battery in the power battery pack and management system 31.

The high voltage power distribution unit 32 serves as a power distribution unit of the hybrid power system, and has the advantages of a centralized power distribution scheme, compact structural design, convenient wiring layout and convenient and quick maintenance. In addition, the management system of a power battery pack can accurately estimate the state of charge (SOC) of the power battery pack, namely the residual electric power of the battery, such that the SOC can be maintained in a reasonable range, damage to the battery due to overcharge or overdischarge can be prevented, the working state of the power battery pack can be dynamically monitored, the condition of the power battery pack can be given in time, and thus, the reliability and high efficiency of running of the whole battery pack can be maintained.

In the practical engineering application of the vehicle, battery capacity cannot be increased without limitation, selection of the battery capacity is usually limited from the aspects of cost, whole vehicle arrangement space, whole vehicle weight and the like, such that the power battery capacity on the vehicle is limited, and a battery power loss phenomenon may occur when the vehicle runs for a long distance in a pure electric mode. Therefore, the vehicle-mounted electric power generation device 4 can ensure long-term work of the power battery device 3, and can supplement electric power to the power battery device 3 in time under the condition that the electric power of the power battery device 3 is insufficient, such that the power battery device 3 can be maintained in a proper electric power range, and a purpose that the charging and discharging processes of the power battery device 3 are more efficient is achieved. In an optional embodiment of the present invention, the vehicle-mounted electric power generation device 4 may adopt a range extender system, a power follower, a fuel cell system and the like, and the embodiment of the present invention does not specifically limit the type of the vehicle-mounted electric power generation device 4.

While it has been described above that the traditional power device 1 and the motor driving device 2 are respectively coupled to the driving shaft 21 of the vehicle to drive the wheels 22 to rotate, in order to further reduce the complexity of the mechanical mechanism of the hybrid power system, preferably, according to the embodiment of the present invention, the traditional power device 1 and the motor driving device 2 are respectively coupled to different driving shafts 21 of the vehicle. Specifically, differential mechanisms are adopted to couple the traditional power device 1 and the motor driving device 2 to the different driving shafts 21 of the vehicle respectively. As shown in FIG. 2, the traditional power device 1 is coupled to one driving shaft 21 by a first differential mechanism 13, and the motor driving device 2 is coupled to the other driving shaft 21 by a second differential mechanism 26. According to the coupling connection mode, a special mechanical coupling device is not needed to couple the traditional power device 1 and the motor driving device 2 to the same driving shaft 21, such that a direct mechanical coupling relationship does not exist between the traditional power device and the motor driving device, and the complexity of the mechanical mechanism of the power system is greatly reduced.

With continued reference to FIG. 2, in an embodiment of the present invention, the hybrid power system may further include a whole vehicle control system 5. The whole vehicle control system 5 is configured to control the traditional power device 1, the motor driving device 2, the power battery device 3 and the vehicle-mounted electric power generation device 4 according to an electric power state of a power battery and driving state data, such that the hybrid power system works in different working modes. In this embodiment, the second engine 41, the generator controller 43 and the high voltage power distribution unit 32 are in low voltage electrical connection with the whole vehicle control system 5 respectively.

In this embodiment, the working modes of the hybrid power system mainly include five working modes including a pure electric mode, a series mode, a parallel mode, a traditional driving mode and a series-parallel mode. The various working modes of the hybrid power system are described in detail below.

In the pure electric mode, the power battery device 3 supplies the electric power to the motor driving device 2, the motor driving device 2 works and provides power for the driving shaft 21 coupled thereto, and meanwhile, the traditional power device 1 and the vehicle-mounted electric power generation device 4 do not work. For example, under the condition that the electric power of the power battery pack is relatively sufficient, the power battery pack and management system 31 supplies electric energy to the motor driving device 2 via the high voltage power distribution unit 32, the motor driving device 2 provides power for the driving shaft 21 coupled thereto, and the driving shaft 21 drives the wheels 22 to move. The pure electric mode is very suitable for road conditions that frequent acceleration and deceleration are required and the rotation speed of the motor driving device 2 is maintained in a low range, such as urban road conditions and road congestion conditions.

In the series mode, the power battery device 3 supplies the electric power to the motor driving device 2, the motor driving device 2 works to provide power for the driving shaft 21 coupled thereto, and meanwhile, the vehicle-mounted electric power generation device 4 works, while the traditional power device 1 does not participate in driving. Specifically, the whole vehicle control system 5 coordinates the vehicle-mounted electric power generation device 4, and enables the second engine 41 and the electric power generator 42 of the vehicle-mounted electric power generation device 4 to simultaneously work in their respective high-efficiency areas, to supply the electric power to the motor driving device 2 according to the principle of optimal efficiency, and then the motor driving device 2 provides power for the driving shaft 21 coupled thereto. The series mode is also very suitable for road conditions that frequent acceleration and deceleration are required and the rotation speed of the driving device is maintained in a low range, such as urban road conditions and road congestion conditions. In addition, by the series mode of the embodiment of the present invention, the problems of low efficiency, poor emission and the like at low rotation speed of the engine can further be avoided effectively.

In the parallel mode, the motor driving device 2 and the traditional power device 1 are both in a working state and provide power for the driving shafts 21 coupled thereto respectively, and meanwhile, the power battery device 3 supplies the electric power to the motor driving device 2, while the vehicle-mounted electric power generation device 4 does not work. The parallel mode is very suitable for working conditions requiring high-power driving, such as acceleration and climbing working conditions.

In the traditional driving mode, the traditional power device 1 works, the first engine 11 provides power for the driving shaft 21 coupled thereto via a closed clutch 14, and meanwhile, the motor driving device 2 does not participate in driving. Because of the universal characteristics of the engine itself, the traditional driving mode is very suitable for working conditions requiring high-speed running of the engine, such as highway working conditions.

In the series-parallel mode, the motor driving device 2 and the traditional power device 1 are both in a working state to provide power for the driving shafts 21 coupled thereto respectively, and meanwhile, the power battery device 3 supplies the electric power to the motor driving device 2, and the vehicle-mounted electric power generation device 4 runs to generate the electric power. In addition, the whole vehicle control system 5 controls the clutch 14 to be closed in a coordinated manner, such that the clutch 14 is mechanically connected with the first engine 11, torque distribution between the first engine 11 and a driving motor 23 is controlled in a coordinated manner, and the vehicle-mounted electric power generation device 4 is controlled in a coordinated manner for efficient electric power generation. The series-parallel mode is very suitable for working conditions requiring high-power driving, such as acceleration and climbing working conditions, and is also suitable for working conditions with low electric power of the power battery pack in the power battery device 3.

In summary, in the pure electric mode and the series mode of the hybrid power system, the motor driving device 2 works, and the traditional power device 1 does not work. In the traditional driving mode, the traditional power device 1 works, and the motor driving device 2 does not work. In both the parallel mode and the series-parallel mode, the motor driving device 2 and the traditional power device 1 both work.

With continued reference to FIG. 2, the motor driving device 2 further includes the driving motor 23, a driving motor controller 24, a second speed changing device 25 and a second differential mechanism 26, and the motor driving device 2 is coupled to the driving shaft 21 via the second differential mechanism 26. The driving motor 23 is in high voltage electrical connection with the driving motor controller 24 and is mechanically connected with the second speed changing device 25. The second speed changing device 25 is mechanically connected with the second differential mechanism 26. The driving motor controller 24 and the second speed changing device 25 are respectively connected with the whole vehicle control system 5. In this embodiment, the driving motor 23 may adopt a shaft driving motor, a rim driving motor, a hub motor and the like. The second speed changing device 25 may adopt a speed reducer or transmission mechanisms in any other form, of course, in some motor driving devices 2, the second speed changing device 25 is not required.

When the motor driving device 2 participates in driving, for example, when the hybrid power system is in the parallel mode, the whole vehicle control system 5 controls the driving motor controller 24 in a coordinated manner, the driving motor 23 is controlled by the driving motor controller 24 to output power so as to drive the second speed changing device 25 to work, and the second speed changing device 25 transmits power to the second differential mechanism 26 through a transmission shaft so as to drive the wheels 22 to rotate through the driving shaft 21. When the motor driving device 2 does not participate in driving, for example, when the hybrid power system is in the traditional driving mode, the motor driving device 2 does not participate in driving, and the whole vehicle control system 5 also controls the driving motor controller 24, such that the driving motor 23 is in a free rotation state.

The traditional power device 1 further includes a first speed changing device 12 and the first differential mechanism 13. The first engine 11 is dynamically coupled to the first speed changing device 12 via the clutch 14, namely, the first engine 11 is mechanically connected with the first speed changing device 12. The first speed changing device 12 is mechanically connected with the first differential mechanism 13 arranged on the driving shaft 21, such that the traditional power device 1 is coupled to the driving shaft 21 via the first differential mechanism 13. Moreover, the first speed changing device 12 and the first engine 11 are in low voltage electrical connection with the whole vehicle control system 5 respectively.

When the traditional power device 1 participates in driving, for example, when the hybrid power system is in the parallel mode or the traditional driving mode, the whole vehicle control system 5 controls the clutch 14 to be closed in a coordinated manner, such that the clutch 14 is mechanically connected with the first engine 11. Moreover, the whole vehicle control system 5 controls the first engine 11 to work, power generated when the first engine 11 works is transmitted to the clutch 14 through an output shaft of the first engine, the clutch 14 transmits the power to an input shaft of the first speed changing device 12 through an output shaft of the clutch, then the power is transmitted to the first differential mechanism 13 through a transmission shaft, and the power drives the wheels 22 to rotate via the driving shaft 21. When the traditional power device 1 does not participate in driving, for example, when the hybrid power system is in the series mode, the whole vehicle control system 5 controls the first engine 11 not to work. In addition, the whole vehicle control system 5 controls the clutch 14 in a coordinated manner to disconnect the mechanical connection between the clutch 14 and the first engine 11, such that the first engine 11 stops passive rotation, and thus, the running resistance of the vehicle is reduced, and the system efficiency is improved.

In an embodiment of the present invention, the hybrid power system may also be provided with a fuel supply system configured to supply fuel to the first engine 11 and the second engine 41. In FIG. 2, the hybrid power system in the embodiment of the present invention is provided with two fuel supply systems including a first fuel supply system 61 and a second fuel supply system 62. The first fuel supply system 61 is in low voltage electrical connection with the first engine 11, the second fuel supply system 62 is in low voltage electrical connection with the second engine 41, and the first fuel supply system 61 and the second fuel supply system 62 convey fuel to the first engine 11 and the second engine 41 through oil supply pipelines respectively. The fuel provided by the fuel supply systems may be gasoline, diesel, natural gas, methanol and the like. In addition, the fuel of the first engine 11 and the fuel of the second engine 41 may be the same type of fuel and may also be different types of fuel.

As already mentioned above, in the hybrid power system, the whole vehicle control system 5 can control the traditional power device 1, the motor driving device 2, the power battery device 3 and the vehicle-mounted electric power generation device 4 according to the electric power state of the power battery and the driving state data, such that the hybrid power system works in different working modes. In fact, the hybrid power system may further include a driving state data acquisition device configured to acquire current driving state data of the vehicle, further assisting in the whole vehicle control system 5 to identify the current driving state of the vehicle and the driving state to be in in the future time period, and further controlling the hybrid power system to work in a working mode which conforms to the current driving state so as to enable the hybrid power system to run efficiently.

Figure 3:
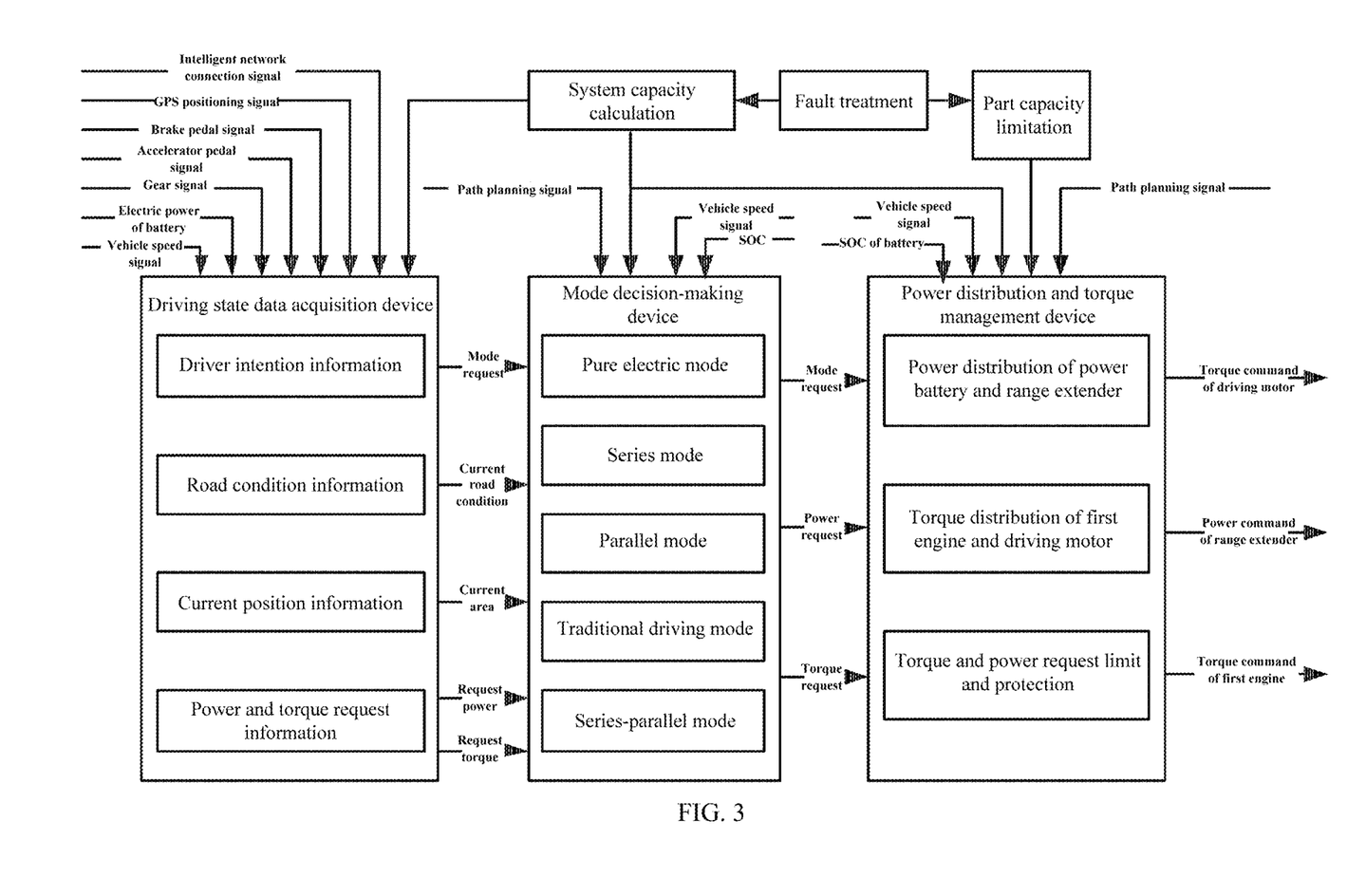
FIG. 3 is a schematic diagram of a mode decision-making process according to an embodiment of the present invention.

Referring to FIG. 3, in an embodiment of the present invention, the vehicle driving state data acquired by the driving state data acquisition device may at least include driver intention information, road condition information, current position information, and power and torque request information. In addition, in this embodiment, the driving state data acquisition device may further be configured to acquire a brake pedal signal, an accelerator pedal signal, a gear signal and a vehicle speed signal of the vehicle to determine the driver intention information and the power and torque request information. In a driving process, a driver controls acceleration or deceleration of the vehicle through an accelerator pedal, a brake pedal and a gear change, such that the desired acceleration or deceleration characteristics of the driver in the driving process can be accurately identified through the brake pedal signal, the accelerator pedal signal, the gear signal and the vehicle speed signal, and meanwhile, the power and torque request information of the vehicle can be effectively acquired.

As described above, the vehicle driving state data further include the current position information and the road condition information. Optionally, the driving state data acquisition device may be further configured to acquire the current position information and the road condition information according to an intelligent network connection signal and/or a GPS signal. For example, the current position information of the vehicle can be accurately determined according to the GPS signal, and meanwhile, the road condition information related to the road on which the vehicle runs currently is acquired. Further, the driving environment of the vehicle is sensed in combination with the intelligent network connection signal, and the whole vehicle control system is assisted to adaptively determine the working mode of the hybrid power system, such that the working efficiency of the hybrid power system is in an optimal state.

Further, when the driving state data acquisition device acquires the road condition information according to the intelligent network connection signal and/or the GPS signal, the road condition information in a navigation planning path can be preferentially identified according to a 3D map, the intelligent network connection signal and/or the GPS signal. With development of a network technology and a GPS technology, a user can make a travel route before driving, and a navigation planning path from a departure place to a destination is generated in advance. Therefore, the driving state data acquisition device can also identify the road condition information in the navigation planning path according to the 3D map, the intelligent network connection signal and/or the GPS signal, such that a whole vehicle adjusting system intelligently controls the working mode of the hybrid power system, and the vehicle can run efficiently.

In addition, when the driving state data acquisition device acquires the current position information, vehicle emission regulations of an area of a current position can also be acquired, such that the whole vehicle control system controls the working mode of the vehicle to conform to the regulations. The driving state data acquisition device can acquire the current position information of the vehicle in real time, dynamically determine the area of the current position based on the current position of the vehicle, identify the administrative division of the area, and acquire the vehicle emission regulations of the area. The vehicle emission standards allowed by different administrative areas may be different, and in combination with the vehicle emission regulations of the area of the current position of the vehicle, the whole vehicle control system can be effectively assisted to more intelligently control the working mode of the vehicle, such that the working mode of the vehicle conforms to the vehicle emission regulations of the area.

With continued reference to FIG. 3, after the driving state data acquisition device acquires at least one of the brake pedal signal, the accelerator pedal signal, the gear signal, the vehicle speed signal, the intelligent network connection signal, the GPS signal and the like of the vehicle, and determines the driving state data of the vehicle, such as the driver intention information, the road condition information, the current position information, and the power and torque request information of the vehicle, according to the signals, the determined driving state data are sent to the whole vehicle control system, a mode decision-making device arranged in the whole vehicle control system carries out comprehensive calculation on the received various driving state data, and dynamically selects a proper working mode for the hybrid power system according to the calculation result, and thus, the hybrid power system runs at the optimal efficiency.

After the mode decision-making device selects a working mode for the hybrid power system, a working mode request, a power request, a torque request and the like are sent to a power distribution and torque management device arranged in the whole vehicle control system according to corresponding working modules. The power distribution and torque management device carries out distribution of power, torque and the like and torque and power request limit and protection according to the received various requests, such as power distribution of the power battery and a range extender, torque distribution of the first engine and the driving motor and torque and power request limit and protection. Further, the power distribution and torque management device sends a control command to corresponding components of the hybrid power system according to the distribution result, for example, a command for controlling the torque of the driving motor is sent to the driving motor, a command for controlling the power of the range extender is sent to the range extender, and a command for controlling the torque of the first engine is sent to the first engine.

In fact, when the mode decision-making device selects the working mode for the hybrid power system and the power distribution and torque management device distributes power, torque and the like, the electric power of the power battery (namely the state of charge (SOC) of the power battery pack), the speed information of the vehicle, vehicle path planning information and the like will be considered comprehensively. The vehicle path planning information may be determined according to the input GPS signal.

In addition, according to the embodiment of the present invention, the capacity limitation of the parts of the hybrid power system is detected through the power distribution and torque management device, and when the power or the torque of some parts exceeds the capacity range of the parts, in order to avoid accidents, fault treatment can be carried out on the parts in time, namely, the capacity of the hybrid power system is calculated to reselect a proper working mode of the hybrid power system.

Figure 4:
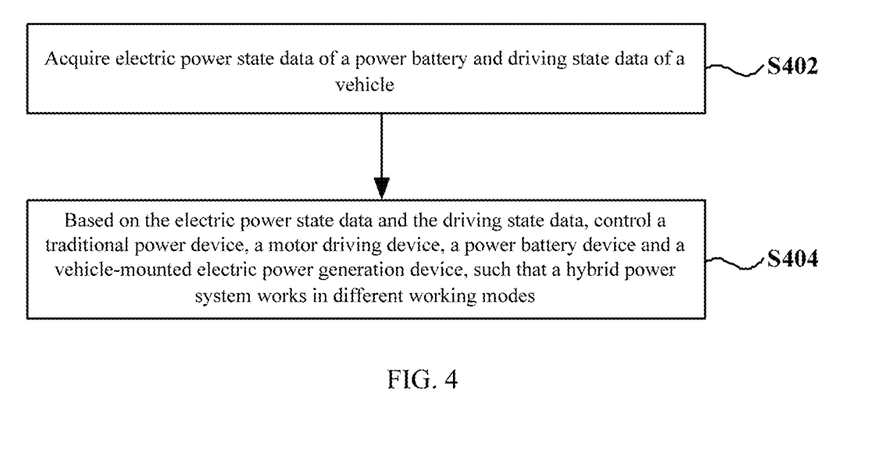
FIG. 4 is a schematic flowchart of a vehicle working mode decision-making method based on a series-parallel hybrid power system according to an embodiment of the present invention.

Based on the same inventive concept, the embodiment of the present invention further provides a vehicle working mode decision-making method based on a series-parallel hybrid power system, used for the series-parallel hybrid power system introduced by the above embodiments. FIG. 4 illustrates a schematic flow diagram of the vehicle working mode decision-making method based on the series-parallel hybrid power system according to the embodiment of the present invention. As shown in FIG. 4, the method may include:

Step S402, electric power state data of a power battery and driving state data of a vehicle are acquired.

Step S404, based on the electric power state data and the driving state data, the traditional power device, the motor driving device, the power battery device and the vehicle-mounted electric power generation device are controlled, such that the hybrid power system works in different working modes.

The embodiment of the present invention provides the vehicle working mode decision-making method with high economy, in which by way of acquiring and analyzing the electric power state data of the power battery and the driving state data of the vehicle, the traditional power device, the motor driving device, the power battery device and the vehicle-mounted electric power generation device can be effectively controlled to work cooperatively, such that the hybrid power system intelligently works in different working modes according to the state of the vehicle itself and the driving state, and thus, the hybrid power system of the vehicle is kept in a high-energy-saving and high-efficiency working mode.

Preferably, in the step S402, when the driving state data of the vehicle are acquired, driver intention information, road condition information, current position information and power and torque request information can be acquired. Acquiring the driver intention information and the power and torque request information may include: acquiring a brake pedal signal, an accelerator pedal signal, a gear signal and a vehicle speed signal of the vehicle to determine the driver intention information and the power and torque request information. When acquiring the road condition information and the current position information, the road condition information and the current position information can be acquired according to an intelligent network connection signal and/or a GPS signal.

When the road condition information is acquired, the road condition information in a navigation planning path can be identified according to a 3D map, the intelligent network connection signal and/or the GPS signal. Because the navigation planning path is generated in advance, the road condition information in the navigation planning path can be accurately acquired through the 3D map, the intelligent network connection signal and/or the GPS signal. It is ensured that the hybrid power system runs in a working condition point area with the optimal system efficiency, the optimal combination of the hybrid power system is found, and the hybrid power system is cooperatively controlled to run efficiently.

Acquiring the current position information further includes: acquiring vehicle emission regulations of an area of a current position, such that the whole vehicle control system controls the working mode of the vehicle to conform to the regulations. In practical application, the vehicle emission regulations in the area can be searched and learned automatically through intelligent networked big data. If a diesel engine is prohibited in some areas, it can be switched to a hybrid power system which conforms to local regulatory requirements for fuel supply, such as natural gas or methanol fuel. Running of the vehicle conforms to the vehicle emissions regulations in various areas to a maximum extent.

In this embodiment, comprehensive judgment is carried out according to the intelligent network connection (5G) signal, the GPS signal, the brake pedal signal, the accelerator pedal signal, the gear signal and the vehicle speed signal. Various road conditions are identified. The current position of the vehicle and the area of the current position are accurately determined. The vehicle emission regulations of the area are further acquired. High-efficiency running of the hybrid power system can be guaranteed, and meanwhile, the working mode of the vehicle conforms to the regulations of the area of the current position.

In an embodiment of the present invention, the working modes of the hybrid power system may include the following five modes:

A pure electric mode: the power battery device supplies electric power to the motor driving device, the motor driving device works to provide power for the driving shaft coupled thereto, and meanwhile, the traditional power device and the vehicle-mounted electric power generation device do not work.

A series mode: the power battery device supplies electric power to the motor driving device, the motor driving device works to provide power for the driving shaft coupled thereto, and meanwhile, the vehicle-mounted electric power generation device works, while the traditional power device does not participate in driving.

A parallel mode: the motor driving device and the traditional power device are both in a working state to provide power for the driving shafts coupled thereto respectively, and meanwhile, the power battery device supplies electric power to the motor driving device, while the vehicle-mounted electric power generation device does not work.

A traditional driving mode: the traditional power device works to provide power for the driving shaft coupled thereto, and meanwhile, the motor driving device does not participate in driving.

A series-parallel mode: the motor driving device and the traditional power device are both in a working state to provide power for the driving shafts coupled thereto respectively, and meanwhile, the power battery device supplies electric power to the motor driving device, and the vehicle-mounted electric power generation device runs to generate the electric power.

Figure 5:
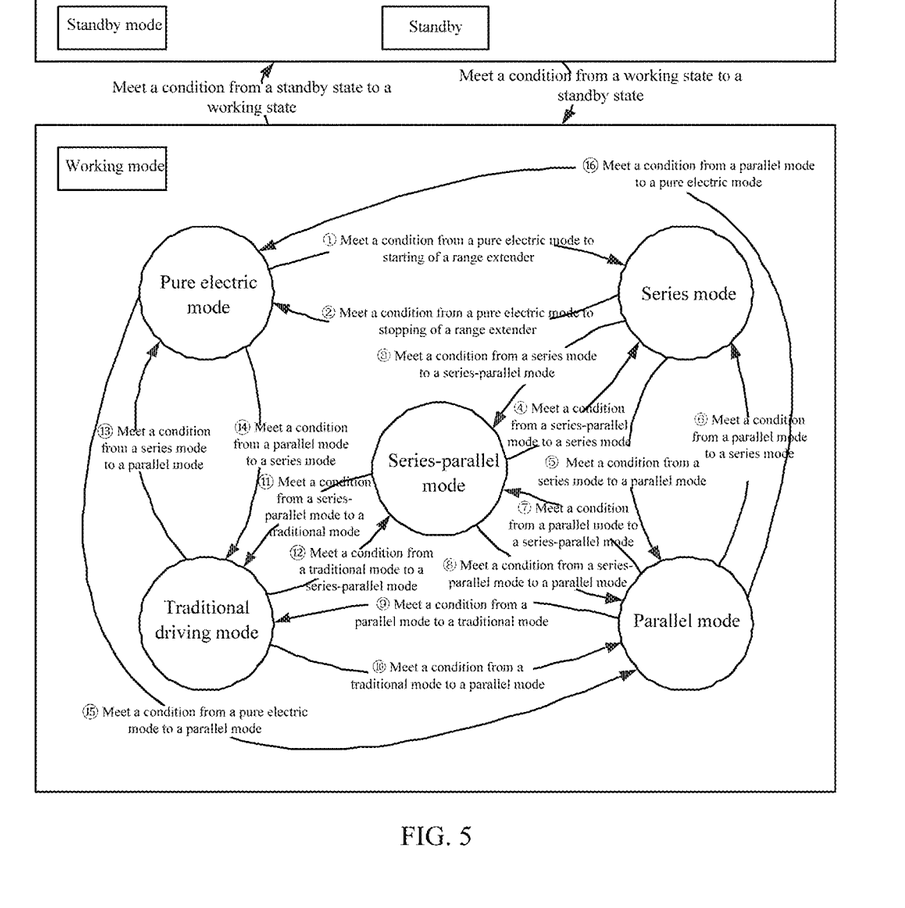
FIG. 5 is a schematic diagram of a switching process of various working modes of a vehicle according to an embodiment of the present invention.

As described above, the whole vehicle control system based on the embodiment of FIG. 2 can dynamically control the vehicle in a coordinated manner according to changes of the vehicle itself, road conditions and working conditions in real time, and controls the hybrid power system to be in an optimal working mode of the vehicle, such that the hybrid power system keeps running at the optimal efficiency. FIG. 5 shows a switching process of the various working modes of the vehicle.

After the vehicle is started, when the vehicle is switched from a standby mode to a working mode, the whole vehicle control system can coordinate and automatically perform mode switching, and an initial default state is the pure electric mode. During switching between the different modes, conditions met are also different, and conditions required for switching between the different modes are respectively described in detail below.

1. Switch from the Pure Electric Mode to the Series Mode

Conditions met: when the SOC of the battery is less than a discharge SOC threshold value of the battery, the battery needs to be charged; and the vehicle is in a climbing road condition or a rapid acceleration working condition.

2. Switch from the Series Mode to the Pure Electric Mode
Conditions met: when the SOC of the battery is greater than a charge maximum SOC of the battery, the battery stops charging; and the vehicle emission regulations of the area of the current position identified according to the GPS signal and the intelligent network connection signal enforce zero emission or pure electric running.

On the basis of the intelligent network connection signal, the 3D map and the navigation path planning, it is identified that a long downhill road condition will occur during running of the vehicle; at the moment, the electric power generation device stops generating electric power, and it is switched to charge the battery by recycled energy of the motor.

3. Switch from the Series Mode to the Series-Parallel Mode

Conditions met: the vehicle is in the climbing road condition or the rapid acceleration working condition; and the vehicle is in a full-load condition, and high-power output is required.

4. Switch from the Series-Parallel Model to the Series Mode

Condition met: the vehicle is in a non-climbing road condition or a non-rapid acceleration working condition.

5. Switch from the Series Mode to the Parallel Mode

Conditions met: the vehicle is in the climbing road condition or the rapid acceleration working condition; and the vehicle is in the full-load condition, and high-power output is required.

6. Switch from the Parallel Mode to the Series Mode

Condition met: the vehicle is in the non-climbing road condition or the non-rapid acceleration working condition.

7. Switch from the Parallel Mode to the Series-Parallel Mode

Conditions met: when the SOC of the battery is less than the discharge SOC threshold value of the battery, the battery needs to be charged; and the vehicle is in the climbing road condition or the rapid acceleration working condition.

8. Switch from the Series-Parallel Mode to the Parallel Mode

Conditions met: when the SOC of the battery is greater than the charge maximum SOC of the battery, the battery stops charging.

The regulations of the area of the position identified by GPS and intelligent network connection enforce that only a non-diesel fuel (such as natural gas and methanol) engine can be adopted for running; at the moment, the engine of a traditional driving system can be controlled to stop working, and only one fuel vehicle-mounted electric power generation device allowed by the regulations can be reserved for working (not limited to a range extender or a fuel cell).

9. Switch from the Parallel Mode to the Traditional Driving Mode

Conditions met: the vehicle is in a highway condition, high-power output is not required (for example, the vehicle enters a constant-speed working condition), and the electric power of the battery is moderate (such as 30% to 80%); at the moment, an electric driving system is controlled to stop working, and meanwhile, the vehicle-mounted electric power generation device is controlled to stop working.

10. Switch from the Traditional Driving Mode to the Parallel Mode

Conditions met: the vehicle is in the climbing road condition or the rapid acceleration working condition; and the vehicle is in the full-load condition, and high-power output is required.

11. Switch from the Series-Parallel Mode to the Traditional Driving Mode

Conditions met: when the SOC of the battery is greater than the charge maximum SOC of the battery, the battery stops charging; and the vehicle enters the highway condition, high-power output is not required (for example, the vehicle enters the constant-speed working condition), the electric power of the battery exceeds a charge maximum value (such as 90%) of the battery, and at the moment, the electric driving system and the vehicle-mounted electric power generation device can be controlled to stop working.

12. Switch from the Traditional Driving Mode to the Series-Parallel Mode

Conditions met: the vehicle is in the climbing road condition or the rapid acceleration working condition; and when the SOC of the battery is less than the discharge SOC threshold value of the battery, the battery needs to be charged.

13. Switch from the Traditional Driving Mode to the Pure Electric Mode

Conditions met: the vehicle enters an urban road condition; and the regulations of the area of the position identified by the GPS and intelligent network connection enforce zero emission/pure electric running.

14. Switch from the Pure Electric Mode to the Traditional Driving Mode

Condition met: the vehicle enters the highway condition.

15. Switch from the Pure Electric Mode to the Parallel Mode

Condition met: the vehicle enters the climbing road condition or the rapid acceleration working condition.

16. Switch from the Parallel Mode to the Pure Electric Mode

Conditions met: the vehicle enters the urban road condition; the vehicle does not have high power requirement; and the electric power of the SOC of the battery is sufficient.

The embodiments of the present invention provide the series-parallel hybrid power system based on double engines. Compared with a traditional single-engine series-parallel hybrid power system with a complex structure and control difficulty, the series-parallel hybrid power system provided by the present invention has the advantages that the mechanical structure is relatively simple, complex mechanical power coupling devices such as planet gears are removed, and a complex mechanical structure is replaced by a simpler and more flexible vehicle working mode decision-making and combined control mode. Not only can the problem of range anxiety of a pure electric vehicle, the problem of low conversion efficiency of a series hybrid electric vehicle under high-speed working conditions and the problem that a series-parallel hybrid power vehicle is too complex in system and too high in control difficulty be solved simultaneously, but also a miniaturization design can be carried out, namely, a traditional engine is replaced by a lower-power, smaller-size and lower-cost engine, and compared with a pure electric scheme, the scheme has the characteristics that the motor system is lower in power, smaller in size and lower in cost, and the power battery system is lower in capacity, smaller in size and lighter in weight. The average oil consumption of an engine system can be further reduced, emission of $CO_2$ and toxic and harmful substances is reduced, the implementation difficulty is low, the value of engineering and mass production is high, and the series-parallel hybrid power system is particularly applicable to the commercial vehicles as well as the heavy trucks.

Further, the present invention further provides the vehicle working mode decision-making method with high economy based on the series-parallel hybrid power system. It is ensured that the power system always runs in a working condition point area with an optimal system efficiency, the optimal combination of power systems is searched, and the power systems are controlled to run efficiently in a coordinated manner.

Hereto, it should be appreciated by those skilled in the art that although a plurality of exemplary embodiments of the present invention have been shown and described in detail herein, many other variations or modifications in accordance with the principles of the present invention can be directly determined or derived from the disclosure of the present invention without departing from the spirit and scope of the present invention. Therefore, the scope of the present invention should be understood and deemed to cover all such other variations or modifications.

The invention claimed is:

1. A series-parallel hybrid power system for a vehicle, comprising a traditional power device and a motor driving device, the traditional power device and the motor driving device being able to be respectively coupled to a driving shaft of the vehicle to drive wheels to rotate, and the traditional power device comprising a first engine, wherein the hybrid power system further comprises:
   a power battery device configured to store electric power and supply the electric power to the motor driving device and/or other vehicle electrical loads; and
   a vehicle-mounted electric power generation device including a second engine and an electric power generator, wherein the second engine is configured to drive the electric power generator to generate the electric power, such that the electric power is supplied to any of the motor driving device, the power battery device and other vehicle electrical loads or a combination thereof,
   wherein the hybrid power system further comprises: a whole vehicle control system configured to control the traditional power device, the motor driving device, the power battery device and the vehicle-mounted electric power generation device according to an electric power state of a power battery and driving state data, such that the hybrid power system works in different working modes,
   wherein the working modes comprise:
      a pure electric mode, wherein the power battery device supplies the electric power to the motor driving device, the motor driving device works to provide power for the driving shaft coupled thereto, and meanwhile, the traditional power device and the vehicle-mounted electric power generation device do not work;
      a series mode, wherein the power battery device supplies the electric power to the motor driving device, the motor driving device works to provide power for the driving shaft coupled thereto, and meanwhile, the vehicle-mounted electric power generation device works, while the traditional power device does not participate in driving;
      a parallel mode, wherein the motor driving device and the traditional power device are both in a working state to provide power for the driving shafts coupled thereto respectively, and meanwhile, the power battery device supplies the electric power to the motor driving device, while the vehicle-mounted electric power generation device does not work;
      a traditional driving mode, wherein the traditional power device works, the first engine provides power for the driving shaft coupled thereto via a closed clutch, and meanwhile, the motor driving device does not participate in driving; and
      a series-parallel mode, wherein the motor driving device and the traditional power device are both in a working state to provide power for the driving shafts coupled thereto respectively, and meanwhile, the power battery device supplies the electric power to the motor driving device, and the vehicle-mounted electric power generation device runs to generate the electric power, wherein the motor driving device further comprises a driving motor, a driving motor controller, a second speed changing device and a second differential mechanism, and the motor driving device is coupled to the driving shaft via the second differential mechanism; and in the traditional driving mode, the whole vehicle control system controls the driving motor controller, such that the driving motor is in a free rotation state.

2. The series-parallel hybrid power system according to claim 1, wherein the traditional power device and the motor driving device are respectively coupled to different driving shafts of the vehicle.

3. The series-parallel hybrid power system according to claim 1, wherein the hybrid power system further comprises: a driving state data acquisition device configured to acquire current driving state data of the vehicle, the current driving state data of the vehicle includes driver intention information, road condition information, current position information, and power and torque request information.

4. The series-parallel hybrid power system according to claim 3, wherein the driving state data acquisition device is configured to acquire a brake pedal signal, an accelerator pedal signal, a gear signal and a vehicle speed signal of the vehicle to determine the driver intention information and the power and torque request information.

5. The series-parallel hybrid power system according to claim 3, wherein the driving state data acquisition device is configured to acquire the current position information and the road condition information according to an intelligent network connection signal and/or a GPS signal.

6. The series-parallel hybrid power system according to claim 5, wherein acquiring the road condition information further comprises: identifying the road condition information in a navigation planning path according to a 3D map, the intelligent network connection signal and/or the GPS signal.

7. The series-parallel hybrid power system according to claim 5, wherein acquiring the current position information further comprises: acquiring vehicle emission regulations of an area of a current position, such that the whole vehicle control system controls the working mode of the vehicle to conform to the regulations.

8. The series-parallel hybrid power system according to claim 1, wherein the traditional power device further comprises a first speed changing device, a first differential mechanism, and the clutch, the first engine is dynamically coupled to the first speed changing device via the clutch, and the first differential mechanism is coupled to the driving shaft so that the traditional power device is coupled to the driving shaft; and in the series mode, the whole vehicle control system disconnects mechanical connection of the clutch, such that the first engine stops passive rotation.

9. A vehicle working mode decision-making method based on a series-parallel hybrid power system, used for the series-parallel hybrid power system according to claim 1, and comprising:

acquiring electric power state data of a power battery and driving state data of a vehicle; and based on the electric power state data and the driving state data, controlling the traditional power device, the motor driving device, the power battery device and the vehicle-mounted electric power generation device, such that the hybrid power system works in different working modes.

10. The vehicle working mode decision-making method according to claim 9, wherein the driving state data comprise driver intention information, road condition information, current position information, and power and torque request information.

11. The vehicle working mode decision-making method according to claim 10, wherein acquiring the driver intention information and the power and torque request information comprises: acquiring a brake pedal signal, an accelerator pedal signal, a gear signal and a vehicle speed signal of the vehicle to determine the driver intention information and the power and torque request information.

12. The vehicle working mode decision-making device according to claim 10, wherein acquiring the road condition information and the current position information comprises: acquiring the current position information and the road condition information according to an intelligent network connection signal and/or a GPS signal.

13. The vehicle working mode decision-making method according to claim 12, wherein acquiring the road condition information further comprises: identifying the road condition information in a navigation planning path according to a 3D map, the intelligent network connection signal and/or the GPS signal.

14. The vehicle working mode decision-making method according to claim 12, wherein acquiring the current position information further comprises: acquiring vehicle emission regulations of an area of a current position, such that a whole vehicle control system controls the working mode of the vehicle to conform to the regulations.

15. The vehicle working mode decision-making method according to claim 9, wherein the working modes comprise:

a pure electric mode, wherein the power battery device supplies electric power to the motor driving device, the motor driving device works to provide power for the driving shaft coupled thereto, and meanwhile, the traditional power device and the vehicle-mounted electric power generation device do not work;

a series mode, wherein the power battery device supplies electric power to the motor driving device, the motor driving device works to provide power for the driving shaft coupled thereto, and meanwhile, the vehicle-mounted electric power generation device works, while the traditional power device does not participate in driving;

a parallel mode, wherein the motor driving device and the traditional power device are both in a working state to provide power for the driving shafts coupled thereto respectively, and meanwhile, the power battery device supplies electric power to the motor driving device, while the vehicle-mounted electric power generation device does not work;

a traditional driving mode, wherein the traditional power device works to provide power for the driving shaft coupled thereto, and meanwhile, the motor driving device does not participate in driving; and a series-parallel mode, wherein the motor driving device and the traditional power device are both in a working state to provide power for the driving shafts coupled thereto respectively, and meanwhile, the power battery device supplies electric power to the motor driving device, and the vehicle-mounted electric power generation device runs to generate the electric power.

* * * * *

UNITED STATES PATENT AND TRADEMARK OFFICE
CERTIFICATE OF CORRECTION

PATENT NO. : 11,548,368 B2
APPLICATION NO. : 16/968442
DATED : January 10, 2023
INVENTOR(S) : Shufu Li et al.

It is certified that error appears in the above-identified patent and that said Letters Patent is hereby corrected as shown below:

In the Claims

At Claim 12, Column 20, Line 11, delete "decision-making device" and insert --decision-making method--, therefor.

Signed and Sealed this
Fourth Day of April, 2023

Katherine Kelly Vidal
*Director of the United States Patent and Trademark Office*